United States Patent [19]

Pritchett

[11] 4,108,948

[45] Aug. 22, 1978

[54] COMPATIBILIZATION OF THERMOPLASTIC COPOLYMERS

[75] Inventor: Ervin G. Pritchett, Cincinnati, Ohio

[73] Assignee: National Distillers and Chemical Corporation, New York, N.Y.

[21] Appl. No.: 794,786

[22] Filed: May 9, 1977

[51] Int. Cl.² .............................................. C08L 23/08
[52] U.S. Cl. ........................ 260/897 B; 260/DIG. 32
[58] Field of Search ................... 260/897 B, DIG. 32

[56] References Cited

U.S. PATENT DOCUMENTS

| 3,236,914 | 2/1966 | Murdock et al. ................... 260/857 |
| 3,336,149 | 8/1967 | Fox et al. ...................... 260/29.6 SQ |
| 3,437,718 | 4/1969 | Rees ............................... 260/897 B |

FOREIGN PATENT DOCUMENTS

| 8,837 | 1965 | Japan ....................................... 260/897 B |
| 760,179 | 10/1956 | United Kingdom ..................... 264/182 |

*Primary Examiner*—Carman J. Seccuro
*Attorney, Agent, or Firm*—Kenneth D. Tremain

[57] ABSTRACT

Compatibilized blends and composites of (a) a thermoplastic copolymer of an alkenyl aromatic monomer and an alkenyl nitrile monomer together with (b) a thermoplastic copolymer of ethylene and a vinyl ester are formed by mixing the copolymers in the presence of an acid compatibilization agent prior to, concurrently with, or subsequent to, mild cross-linking of copolymer (b).

29 Claims, No Drawings

COMPATIBILIZATION OF THERMOPLASTIC COPOLYMERS

BACKGROUND OF THE INVENTION

1. Field of the Invention

This invention relates to the field of compatibilized blends and composites of (a) thermoplastic copolymers of at least one alkenyl aromatic monomer and at least one alkenyl nitrile monomer and (b) copolymers of ethylene and at least one vinyl ester, and more particularly, to blends and composites of styrene-acrylonitrile copolymers and ethylene-vinyl acetate copolymers compatibilized by coreaction with a minor amount of an acid compatibilization agent.

2. Description of the Prior Art

It is well known in the art to produce high impact strength grades of alkenyl aromatic-alkenyl nitrile copolymers, particularly styrene-acrylonitrile (SAN) copolymers, by blending the copolymers with a nitrile rubber. Alternatively, the alkenyl aromatic and alkenyl nitrile monomers may be copolymerized in the presence of a polydiene rubber, usually a polybutadiene (PBD), to produce graft copolymers having particularly desirable properties of impact resistance, moldability, tensile strength and solvent resistance to alcohols and oils. Such compositions, of which the acrylonitrile-butadiene-styrene (ABS) copolymers are perhaps the best known representatives have poor properties of weather resistance, of heat aging resistance and of solvent resistance to ketones and aromatics.

Much effort has been expended to find a suitable substitute for the polydiene portion of ABS and similar copolymers. Among other candidates, rubbery ethylene-vinyl acetate (EVA) has been suggested, e.g., by Bartl and Hardt, Adv. Chem. Ser. No. 91, 477 (1969). However SAN does not suitably graft to EVA. Recent attempts to overcome this problem have included pre-exchanging some of the acetate groups of EVA for methacrylate groups thereby introducing graftable unsaturation therein (Japan Pat. No. 73-01,715), or by coreacting some 5–40% of a monoolefin in a modified grafting operation as described in U.S. Pat. No. 3,855,353. The latter technique requires the use of a solvent or large volumes of water and is limited to the use of EVA copolymers having a melt flow rate (MFR) in the range of from about 0.1 to 100, preferably from 3 to 5 under Condition E of ASTM D-1238. In the still more complex grafting procedure described in U.S. Pat. No. 3,742,090, SAN is grafted onto EVA which has been previously modified by the introduction of acrylic type unsaturation therein.

When a combination of components which normally are incompatible is desired, it is now known to achieve compatibilization by adding a preformed graft copolymer in which segments represent each of the incompatible components as in U.S. Pat. No. 3,485,777, or to react a mixture of such materials with a coupling agent, for example, a combination of an unsaturated carboxylic anhydride and a free radical initiator, to induce in situ grafting as in U.S. Pat. No. 3,645,939. Even these procedures have disadvantages: the process of the former patent requires special graft copolymer additives while that of the latter patent requires a volatile coupling agent which offers very low efficiency in practice.

In contrast to the complex processes previously described, my copending U.S. patent application Ser. No. 600,332, filed July 30, 1975, discloses and claims a simple, rapid and efficient process for the compatibilization of a variety of thermoplastic blends and composites by suitably mixing nitrile group-containing and nitrile-condensable functional group-containing components with a minor amount of an acid condensing agent. Compatibilized blends of SAN and EVA copolymers prepared in accordance with my aforesaid copending application demonstrated remarkable resistance to falling weight impact. However, it was found that the notched Izod impact resistance according to ASTM D-256 for unmodified polyalloys was lower than desirable, certain lower molecular weight components being required to induce suitable Izod impact strength.

SUMMARY OF THE INVENTION

It now has been found possible to impart excellent Izod impact resistance, and concurrently, to increase falling weight impact resistance for polyalloys of ethylene-vinyl ester copolymer in alkenyl aromatic-alkenyl nitrile copolymer by partly crosslinking the rubbery ethylene-vinyl ester copolymer component, prior to, concurrently with, or subsequent to, compatibilization of the copolymers with an acid compatibilization agent.

As used herein, the term "compatibilization" and terms of like import shall be understood to mean the conversion of a mixture of at least two components into a grossly homogeneous, permanently miscible composition which is not subject to spontaneous separation of the components and which has properties not characteristic of the simple mixture of the components. The term polyalloy as used herein shall be understood to mean a compatibilized blend of normally incompatible polymers, particularly normally incompatible thermoplastic polymers.

DESCRIPTION OF THE PREFERRED EMBODIMENTS

In one embodiment of this invention, polyalloy compositions are obtained from (a) thermoplastic copolymers of at least one alkenyl aromatic monomer with at least one alkenyl nitrile monomer and (b) thermoplastic copolymers of ethylene and at least one vinyl ester, the product polyalloys having impact resistances greater than about 1.5 as ft. lb. per in. in the notched Izod test or as in. lb. per mil in the Gardner dart drop test. This and other embodiments of the present invention are realized by mixing alkenyl aromatic-alkenyl nitrile copolymer and ethylene-vinyl ester copolymer components together with a compatibilizing amount of an acid compatibilizing agent, the ethylene-vinyl ester copolymer being characterized by a melt flow rate less than about one according to ASTM D-1238, Condition E (190° C., 2.16 Kg.) and preferably less than about 20 according to ASTM D-1238, Condition F (190° C., 21.6 Kg). Ethylene-vinyl ester copolymers suitable for the compositions of this invention can be conveniently prepared by toughening or crosslinking high melt flow copolymers via known and conventional means, or by the method disclosed and claimed in commonly assigned copending U.S. patent application Ser. No 794,785 prior to, during or following compatibilization into the polyalloys of the invention. For example, the melt flow of an ethylene-vinyl ester copolymer can be reduced to an acceptable level prior to the compatibilization step by reaction with a peroxide such as dicumyl peroxide (DICUP) which results in crosslinking. Where crosslinking is accomplished prior to the compatibilization step, it is highly advantageous to introduce no more than about 20 percent insoluble gel into the crosslinked ethylene-vinyl ester copolymer. Alternatively, a suitable crosslinking agent such as boric acid can be added during or after the compatibilization reaction involving high melt flow ethylene-vinyl ester copolymers. Numerous other known and conventional crosslinking agents can also be used as will be evident to those skilled in the art.

It is believed that the compatibilizations realized in the practice of this invention result from a type of crosslinking between the components as a result of intercondensation reactions involving nitrile groups and functionality condensable therewith, the acid acting as a condensation agent. Such condensation reactions are known in simple monomolecular chemistry. It is surprising, however, that polymer reactions of such nature are possible at rapid rates, and yield novel and useful compositions without an extreme loss of thermoplasticity through crosslinking. It is also surprising on the basis of prior chemical art that acids having pKa values of more than about 1 may serve as condensation agents for components containing nitrile functionality with those containing alcohol functionality. In addition to and despite the chemistry suggested above, it is to be noted that other, obscure factors are involved in the process of the present invention. For example, oxygen is found to be beneficial to rapid reaction rates, a factor not clearly applicable to acid induced condensation. Similarly, melt viscosity increase versus time plots for the alloying of certain thermoplastics via the process of this invention is non-linear, suggesting phase changes occur which are not predictable on the basis of the chemistry thought to be involved.

In the practice of this invention, the component thermoplastic copolymer of at least one alkenyl aromatic monomer and at least one alkenyl nitrile monomer can include copolymers of such monomers as styrene, vinyl styrene, alpha-methyl styrene, isopropenyl toluene and the like with nitrolic monomers such as acrylonitrile, methacrylonitrile, methyleneglutaronitrile, and the like. Advantageously, the copolymers contain not more than about 50 mole percent or less than 5 mole percent nitrolic monomer.

The component copolymer of ethylene with at least one vinyl ester can include copolymers and mixed copolymers of ethylene with vinyl esters of acids such as formic, acetic, propionic, cyclohexanecarboxylic, benzoic, cinnamic, linoleic and versatic acids, and the like; that with acetic acid being particularly preferred. The component copolymer of ethylene and vinyl ester advantageously contains from about 20 to about 70, preferably from about 35 to about 65 percent by weight vinyl ester. Up to about 50 percent of the vinyl ester content of the copolymer, but preferably not more than about 20 percent by weight, can be saponified to combined vinyl alcohol. Also, the use of ethylene-vinyl ester copolymers containing up to about 20 percent, preferably up to about 10 percent by weight only, of modifying monomer such as carbon monoxide, sulfur dioxide, vinyl ethers, and the like, is included in the scope of this invention.

The component copolymers of the polyalloys of this invention generally have molecular weights in the thermoplastic range of about 10,000 to about 1,000,000. However, lower molecular weight modifiers such as polyfunctional esters or nitriles having molecular weights down to about 100 may be included in minor quantities of less than about 15 percent, preferably less than about 5 percent by weight. Examples of such low molecular weight modifiers are styrene-acrylonitrile oligomer, glycol and its carboxylic esters such as tristearic, polyesters such as poly(butanediol-1,4) terephthalate, dicyanobutane, and the like.

The acid compatibilization agent is a proton donor acid having a pKa in water less than about 4, and preferably less than about 3 when the ethylene-vinyl ester polyalloy component contains free hydroxyl functionality (e.g., in partly saponified EVA); but the acid compatibilization agent must have a pKa less than about 1 if the ethylene-vinyl ester component contains no free hydroxyl functionality. Examples of acid compatibilization agents are aryl sulfonic acids such as benzene sulfonic, toluene sulfonic, napthalene sulfonic, dodecylbenzene sulfonic, and the like; alkyl esters of sulfuric acid such as lauryl sulfonic, and the like; carboxylic acids such as oxalic, trichloroacetic, 2-methyl-6-nitrobenzoic, and the like; other organic acids such as picric, citric, salicylic, d-tartaric, mandelic, and the like; as well as inorganic acids such as perchloric, sulfuric, sulfamic, hydrochloric, phosphorous, bisulfate ion acids (e.g. $KHSO_4$), and the like. The aryl sulfonic acids are preferred acids of pKa less than 1 since they are not as destructive as, for example, sulfuric acid which causes severe polyalloy darkening. Of the acids having pKa of about 3 to 1, sulfamic and bisulfate ion acid are preferred.

Advantageously, the copolymers are melt blended together with the acid compatibilization agent, and if necessary and desired, a crosslinking agent, in a suitable mill or extruder.

While a low shear mixing apparatus such as a two roll mill can be utilized for this purpose, it is preferable to conduct the blending operation in high shear mixing apparatus such as a Banbury or C.W. Brabender Plastograph mixer, or a twin screw extruder, because of the accelerated rate with which the polyalloying reaction proceeds in such devices. Thus, for example, the components, which are functionally reactive materials, are intimately mixed, the acid compatibilization agent, and optionally, the crosslinking agent, are injected into the functionally reactive materials and mixing is continued until the reaction has reached the desired level of completeness. Alternatively, the acid compatibilization agent and, if used, crosslinking agent, can be pre-mixed with one of the component copolymers with the other copolymer then being added to this pre-mix, mixing of the whole being continued until the desired level of reaction is achieved. Those skilled in the art will discern various ways in which the component materials can be brought together in the compatibilization reaction of this invention and the process of this invention is not to be limited to any particular mode of combination of these materials. However, it is preferred for simplicity to inject an aqueous solution of the acid in an amount just sufficient to induce the desired compatibilization into a melt blend of the component materials and to shear blend the mixture until suitable compatibilization is complete.

The temperature of the mixing operation is in the range of about 100° to 300° C., preferably about 125° to 250° C. The pressure employed is not critical and is preferably ambient. It is usually convenient to effect mixing under an inert atmosphere such as nitrogen, argon, and the like; but the inert atmosphere is not essential, particularly if some darkening in color of the polyalloy is of no concern or if suitable antioxidants are present.

Reaction time for the compatibilization to polyalloy may vary within the range of about 0.02 to one hour or longer, but preferably is in the range of about 0.08 to about 0.8 hour.

The weight ratio of alkenyl aromatic-alkenyl nitrile copolymer to ethylene-vinyl ester copolymer components in the high impact compositions of the present invention should be in the range of about 9 to about 1, preferably in the range of about 6 to about 1.2.

The amount of acid compatibilizing agent should be in the range of about 0.001 to about 8 percent by weight, preferably about 0.1 to about 5 percent by weight of the total composition.

The following Examples are intended to illustrate more clearly the nature of the present invention without limiting its scope. Throughout, all parts and percentages are by weight and temperatures are in degrees centigrade unless otherwise specified. Impact test moldings were made by compression at 185°–195° C. and 8,000 psi, those for Izod in cavity type molds and those for Gardner impact testing in sandwich molds between MYLAR sheets. Izod impact tests were according to ASTM D-256, except with 1/12 in. thick notched specimens. Gardner impact strength was determined on 1¾ × ⅛ in. discs using the Gardner Laboratory, Inc., 1120-M Variable Height Impact Tester, failure being defined as sample penetration. Melt flow rates (MFR) are according to ASTM D-1238. Gel contents of ethylene-vinyl ester copolymers are portions insoluble in a solvent suitable for the copolymer (e.g., toluene for rubbery EVA) as determined by suspending a 0.2–0.3 gram sample held within a fine wire mesh cage in the stirred solvent for 24 hours at room temperature, then drying and weighing any residue.

EXAMPLE 1

To the roller blade equipped, nitrogen blanketed mixing chamber of a C.W. Brabender Plastograph preheated to 170° C. are added 32 parts of SAN and 8 parts of an EVA having a MFR of 23.8 g./ 10 min. (Cond. B) and a 42% vinyl acetate content. The SAN is Dow TYRIL-767 crystal general purpose styrene-acrylonitrile copolymer having about 28% acrylonitrile content. The EVA is an ethylene-vinyl acetate copolymer prepared by the known high pressure copolymerization process. The mixture is masticated at 60 rpm and, after 2 minutes mixing and at a temperature now of 175° C., 0.31 parts of p-toluenesulfonic acid as a 1.5 molar solution in water is injected over one minute. The viscosity of the masticating mass soon begins to increase as measured by torque at 60 rpm, continuing for about 30 minutes at up to 192° C. to a value about 1.4 times the original, indicating crosslinking. One part of water is injected, milling is continued for 15 minutes and the finished composition is removed and cooled.

The Izod impact strength of the product is 0.6 ft. lb./in. and the Gardner impact strength 1.4 in. lb./mil.

EXAMPLE 2

Example 1 is repeated except that there is no addition of p-toluenesulfonic acid, an equal volume of water being injected instead. No torque increase is observed. The product has an Izod impact strength of 0.4 ft. lb./in. and a Gardner impact strength of 0.02 in. lb./mil. These values are found to be only very slightly improved over those for SAN resin only, 0.3 and less than 0.02, respectively.

EXAMPLE 3

Example 1 is repeated except that the EVA has a 43 percent vinyl acetate content and a MFR of only 1.7 g./min. (Cond. B). The Izod impact strength is 6.1 ft. lb./in., but the Gardner impact strength remains only 1.2 in. lb./mil. The broken Izod specimens show dark areas in the torn edges, evidence of a tendency to brittle break.

EXAMPLE 4

To the roller blade equipped mixing chamber of the nitrogen blanketed C.W. Brabender Plastograph preheated to 154° C. are added 40 parts of the EVA of Example 3. With mixing at 30 rpm and internal temperature at 150° C., 0.006 part of dicumylperoxide (DICUP) in 2 parts by volume of toluene is injected. The torque rises from 2,300 MG at 154° C. to 4,600 MG at 163° C. over 25 minutes at which time 0.2 parts of antioxidant mix comprising 1:9 sulfur powder in 2,2-methylene-bis (4-methyl-6-t-butyl phenol)(commonly called "2,2,4,6") are added. The torque increase ceases. The product crosslinked EVA is completely soluble in toluene within 24 hours at room temperature; i.e., there is no toluene insoluble gel.

EXAMPLE 5

The experiment of Example 4 is repeated several times, but adding 0.036 parts DICUP and mixing for the times indicated in Table I before addition of the antioxidant mix. Gel is determined by the portion of a 0.2 part sample in 150 parts by volume of toluene insoluble in 24 hours at room temperature.

TABLE I

| Example, Part | Minutes Mixed | Final Torque, MG (at ° C.) | Gel, % |
|---|---|---|---|
| 5A | 6 | 10,000 (110) | 0 |
| 5B | 8 | 12,400 (175) | 0.2 |
| 5C | 10 | 12,500 (175) | 10.3 |
| 5D | 13 | Off Scale | 23.2 |

EXAMPLE 6

100 parts of the EVA of Example 3 are blended on a two roll mill at 150°–160° C. and 0.06 parts of DICUP in one part by volume of toluene is added and mixed into the resin as rapidly as possible. After milling for 12 minutes, 0.5 parts of stearic acid and 0.5 parts of the antioxidant mix of Example 4 are added and mixed in. The product is soluble in toluene.

EXAMPLE 7

0.19 parts per hundred of DICUP is well mixed into the EVA of Example 3 at 125° C. The mixture is cured 45 minutes at 160° C. According to the test of Example 5, the product is 86.5 percent toluene insoluble.

EXAMPLE 8

Example 3 is repeated several times, but substituting the crosslinked EVA products of Examples 4 through 7 for the original EVA resin and pre-milling 10 minutes rather than 2 minutes to allow better distribution of the crosslinked EVA before the acid addition. Table II summarizes the data obtained. It is obvious that improvements both in Gardner and in Izod impact strength values have been realized. Samples having higher impact values evidence stress whitening at broken edges in the notched Izod test, indicating non-brittle breakage. Products with preferred strength properties are based on EVA having MFR less than about 20 (Cond. F), but with less than about 20 percent gel content.

impact modifier of choice and further increases impact strength.

As in Example 1, 32 parts of SAN and 8 parts of EVA are coreacted with 0.31 part of p-toluenesulfonic acid. However, the polymers are added in the order of ⅔ of the SAN, all of the EVA, then ⅓ of the SAN and 10

TABLE II

Pre-Crosslinked EVA Increases Impact Strength of SAN-EVA Polyalloy

| Example | Source | EVA Impact Modifier | | | Gardner Impact Strength | |
|---|---|---|---|---|---|---|
| | | Plastograph Torque MG (at ° C) | MFR, g/10 min., (Condition) | % Gel | Gardner in.lb./mil | Izod ft/lb./in |
| 3 | Original | 2,000 (155) | 1.7(B);23.8(E) | 0 | 1.2 | 6.1 |
| 8A | Example 4 | 4,600 (163) | 0.9(E); 48.6 (F) | 0 | 1.7 | 5.5 |
| 8B | Example 6 | 8,300 (169) | 1.7 (F) | 0 | 2.9 | 7.0 |
| 8C | Example 5B | 12,400 (175) | — | 0.2 | 2.4 | 10.4 |
| 8D | Example 5C | 12,500 (175) | — | 10.3 | 2.3 | 4.3 |
| 8E | Example 5D | Very High | — | 23.2 | 0.8 | 3.1 |
| 8F | Example 7 | — | — | 86.5 | 0.1 | 0.5 |

EXAMPLE 9

According to the process disclosed and claimed in commonly assigned copending U.S. patent application Ser. No. 794,785, 40 parts of the EVA of Example 3 are milled in air at about 140° C and 30 rpm in C.W. Brabender Plastograph and one part by volume of a half molar solution of sodium acetate is added. When the Plastograph torque reaches 9,900 M.G. at 170° C., a mixture of 0.5 parts stearic acid and 0.5 parts of a 1:9 weight ratio mixture of sulfur and 2,2,4,6 antioxidant is added. The torque rises only a little more, to just over 10,000 M.G. at 170° C. The product EVA, toughened via this process, has a MFR of 2.3 g. per 10 min. under Condition F and contains no toluene insoluble gel.

When a polyalloy of SAN with this EVA is prepared according to Example 8, the product has a Gardner impact resistance of 2.2 in. lb./mil and an Izod impact resistance 5.7 ft. lb./in.

In addition to increases in impact strength, the polyalloys prepared from toughened EVA copolymers are superior in melt flow properties to those prepared from the original EVA. This is illustrated in Table II by comparison of the Plastograph torque versus time data for the preparations of Example 3, Example 8B (DICUP toughened EVA) and Example 9 (sodium acetate catalyzed air oxidative toughening).

TABLE III

Plastograph Torque Versus Time Data in Polyalloying

| Time From Acid Addition, Minutes | Torque, MG (at ° C.), in Example | | |
|---|---|---|---|
| | 3 | 8B | 9 |
| 0 | 6,500 (175) | 7,200 (184) | 8,200 (190) |
| 5 | 7,100 (179) | 7,600 (187) | 9,100 (195) |
| 10 | 7,800 (185) | 8,600 (191) | 9,400 (196) |
| 15 | 8,600 (190) | 9,300 (194) | 9,600 (196) |
| 20 | 9,600 (193) | 9,600 (195) | 9,700 (194) |
| 25 | 10,400 (196) | 8,900 (194) | 9,500 (193) |
| 30 | 10,700 (197) | 8,200 (193) | 9,000 (192) |

The products of Examples 8B and 9 are more readily molded than is that of Example 3, reflecting the improved melt flow properties.

EXAMPLE 10

This Example illustrates that although Gardner impact resistance for SAN-EVA polyalloy can be considerably improved by the expedients of more efficient premixing and the addition of a lubrication medium to improve moldability, low melt flow EVA remains the minutes preblending are allowed before the acid addition. Reaction time is 30 minutes at 60 rpm and 175°–195° C. after the acid addition, then 1.2 parts of stearamide are mixed in (25 rpm for 5 minutes). The results for various EVA modifiers are summarized in Table IV.

TABLE IV

Toughened EVA Increases Polyalloy Impact Strengths

| Experiment Part | % Vinyl Acetate | EVA Impact Modifier Plastograph Torque, MG (at ° C.) | % Gel | Polyalloy Gardner Impact in.lb./mil |
|---|---|---|---|---|
| A | 28 | 4,100 (143) | — | 0.02 |
| B | 28 | 10,000 (170) | — | 0.04 |
| C | 43 | 2,000 (155) | 0 | 2.5 |
| D | 43 | 8,300 (169) | 0 | 3.9 |
| E | 50 | 3,450 (147) | 0 | 3.2 |
| F | 50 | 10,300 (166) | 0 | 3.8 |
| G | 58 | 8,000 (150) | 0 | 2.2 |
| H | 58 | 10,600 (174) | 0 | 2.7 |

EXAMPLE 11

The products of Example 1 and of Example 8B are compared with a commercial ABS resin, Cycolac L (BorgWarner Corporation), to illustrate superior resistance to ketonic solvent. Compression molded discs of each, 1-¾ × ⅛ in., are suspended in acetone at room temperature. The commercial ABS disintegrates within one day. After 7 days immersion in acetone, the polyalloy of Example 1 evidences a weight gain of 41 percent, that of Example 8B a weight gain of 4 percent. When solvent is removed by drying in vacuo, the polyalloy of Example 1 evidences a weight loss from the original of 73 percent, that of Example 8B a weight loss of only 65 percent.

Even under the extreme conditions of the immersion test, it is evident that the polyalloy of Example 8B is superior to the ABS resin in resistance to destruction by acetone.

I claim:

1. A method for the compatibilization of materials normally incompatible with each other which comprises mixing (a) a thermoplastic copolymer of an alkenyl aromatic monomer and an alkenyl nitrile monomer, (b) a thermoplastic copolymer of ethylene and a vinyl ester having a melt flow rate less than about one measured according to ASTM D-1238, Condition E, in the presence of a compatibilization effective amount of (c) an acid compatibilization agent prior to, concurrently with, or subsequent to, mild-crosslinking of copolymer (b) for a period of time sufficient to achieve compatibilization of copolymer (a) and (b).

2. The method of claim 1 wherein the alkenyl aromatic monomer of copolymer (a) is selected from the group consisting of styrene, vinyl styrene, alpha-methyl styrene and isopropenyl toluene, the alkenyl nitrile monomer of copolymer (a) is selected from the group consisting of acrylonitrile, methacrylonitrile and methyleneglutaronitrile, and the vinyl ester monomer of copolymer (b) is a vinyl ester of an acid selected from the group consisting of formic, acetic, propionic, cyclohexanecarboxylic, benzoic, cinnamic, linoleic and versatic acid.

3. The method of claim 2 wherein copolymer (a) is derived from styrene and acrylonitrile and contains not more than 50 mole percent and not less than 5 mole percent acrylonitrile monomeric units and copolymer (b) is ethylene-vinyl acetate copolymer which contains from about 20 to about 70 percent by weight of vinyl acetate and which contains no more than about 20 percent insoluble gel.

4. The method of claim 3 wherein the ethylene-vinyl acetate copolymer contains substantially no free hydroxyl functionality.

5. The method of claim 3 wherein the ethylene-vinyl acetate copolymer is saponified to a level not exceeding about 50 percent by weight of the vinyl acetate content of the copolymer.

6. The method of claim 4 wherein the acid compatibilization agent (c) has a pKa in water less than about 1.

7. The method of claim 6 wherein the acid is selected from the group consisting of benzene sulfonic, toluene sulfonic, naphthalene sulfonic and dodecylbenzene sulfonic acid.

8. The method of claim 5 wherein the acid compatibilization agent (c) has a pKa in water less than about 3.

9. The method of claim 8 wherein the acid is selected from the group consisting of sulfamic and bisulfate ion acid.

10. The method of claim 1 wherein the weight ratio of copolymer (a) to copolymer (b) is about 9 to about 1.

11. The method of claim 10 wherein the acid compatibilization agent is present in the amount of about 0.001 percent to about 8 percent by weight.

12. The method of claim 1 wherein each component is mixed together under conditions of high shear at a temperature of from about 100° C. to 300° C.

13. A method for the compatibilization of materials normally incompatible with each other which comprises mixing (a) a thermoplastic copolymer of an alkenyl aromatic monomer and an alkenyl nitrile monomer and (b) a thermoplastic copolymer of ethylene and a vinyl ester having a melt flow rate less than about one, measured according to ASTM D-1328, Condition E, in the presence of a compatibilization effective amount of (c) an acid compatibilization agent and a crosslink effective amount of (d) an ethylene-vinyl ester crosslinking agent for a period of time sufficient to achieve compatibilization of copolymers (a) and (b).

14. The method of claim 13 wherein the alkenyl aromatic monomer of copolymer (a) is selected from the group consisting of styrene, vinyl styrene, alpha-methyl styrene and isopropenyl toluene, the alkenyl nitrile monomer of copolymer (a) is selected from the group consisting of acrylonitrile, methacrylonitrile and methyleneglutaronitrile, and the vinyl ester monomer of copolymer (b) is a vinyl ester of an acid selected from the group consisting of formic, acetic, propionic, cyclohexanecarboxylic, benzoic, cinnamic, linoleic and versatic acid.

15. The method of claim 14 wherein copolymer (a) is derived from styrene and acrylonitrile and contains not more than 50 mole percent and not less than 5 mole percent acrylonitrile monomeric units and copolymer (b) is an ethylene-vinyl acetate copolymer which contains from about 20 to about 70 percent by weight of vinyl acetate.

16. The method of claim 15 wherein the ethylene-vinyl acetate copolymer contains substantially no free hydroxyl functionality.

17. The method of claim 15 wherein the ethylene-vinyl acetate copolymer is saponified to a level not exceeding about 50 percent by weight of the vinyl acetate content of the copolymer.

18. The method of claim 16 wherein the acid compatibilization agent (c) has a pKa in water less than about 1.

19. The method of claim 18 wherein the acid is selected from the group consisting of benzene sulfonic, toluene sulfonic, naphthalene sulfonic and dodecylbenzene sulfonic acid.

20. The method of claim 17 wherein the acid compatibilization agent (c) has a pKa in water less than about 3.

21. The method of claim 20 wherein the acid is selected from the group consisting of sulfamic and bisulfate ion acid.

22. The method of claim 13 wherein the weight ratio of copolymer (a) to copolymer (b) is about 9 to about 1.

23. The method of claim 22 wherein the acid compatibilization agent is present in the amount of about 0.001 percent to about 8 percent by weight.

24. The method of claim 13 wherein each component is mixed together under conditions of high shear at a temperature of from about 100° C. to 300° C.

25. The method of claim 13 wherein ethylene-vinyl ester crosslinking agent (d) is added to the copolymers (a) and (b) subsequent to the compatibilization of copolymers (a) and (b) with acid compatibilization agent (c), 26. The method of claim 13 wherein the ethylene-vinyl ester crosslinking agent (d) is boric acid.

27. The compatibilized mixture of normally incompatible components produced by the method of claim 1.

28. The compatibilized mixture of normally incompatible components produced by the method of claim 13.

29. The compatibilized mixture of normally incompatible components produced by the method of claim 25.

* * * * *